United States Patent
Foitzik et al.

(10) Patent No.: US 10,023,163 B2
(45) Date of Patent: Jul. 17, 2018

(54) POWER BRAKE SYSTEM HAVING ELECTRONIC SLIP REGULATION, AND METHOD FOR CONTROLLING A POWER BRAKE SYSTEM HAVING ELECTRONIC SLIP REGULATION

(71) Applicant: Robert Bosch GmbH, Stuttgart (DE)

(72) Inventors: Bertram Foitzik, Ilsfeld (DE); Jens Wagner, Untergruppenbach (DE); Matthias Kistner, Bretzfeld (DE); Otmar Bussmann, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/609,784

(22) Filed: May 31, 2017

(65) Prior Publication Data
US 2018/0015912 A1     Jan. 18, 2018

(30) Foreign Application Priority Data
Jul. 13, 2016  (DE) ........................ 10 2016 212 710

(51) Int. Cl.
| | | |
|---|---|---|
| *B60T 13/66* | (2006.01) | |
| *B60T 8/1761* | (2006.01) | |
| *B60T 13/14* | (2006.01) | |
| *B60T 13/68* | (2006.01) | |

(52) U.S. Cl.
CPC .......... *B60T 8/1761* (2013.01); *B60T 13/142* (2013.01); *B60T 13/662* (2013.01); *B60T 13/686* (2013.01)

(58) Field of Classification Search
CPC ...... B60T 11/224; B60T 13/66; B60T 13/143; B60T 13/662; B60T 13/686; B60T 13/745

USPC ......... 303/3, 15, 10, 20, 114.1, 115.1, 115.2, 303/116.1, 116.2
See application file for complete search history.

(56) References Cited

U.S. PATENT DOCUMENTS

| | | | | |
|---|---|---|---|---|
| 8,333,442 B2 * | 12/2012 | Hatano | ................. | B60T 8/4081 303/11 |
| 8,840,199 B2 * | 9/2014 | Hatano | ................. | B60T 8/4081 303/113.1 |
| 2005/0162010 A1 * | 7/2005 | Kamiya | ................. | B60T 8/3655 303/113.4 |
| 2012/0313427 A1 * | 12/2012 | Nishioka | ................. | B60T 7/042 303/10 |

(Continued)

FOREIGN PATENT DOCUMENTS

DE     102014205431 A1    10/2014

*Primary Examiner* — Christopher P Schwartz
(74) *Attorney, Agent, or Firm* — Norton Rose Fulbright US LLP; Gerard Messina

(57) ABSTRACT

A power brake system having electronic slip regulation, and a method for controlling a power brake system having electronic slip regulation. A return line is equipped with a pressure medium storage unit for storing pressure medium with a pressure that is greater than an ambient atmospheric pressure, and is equipped with a blocking device that is controllable and that is situated between the pressure medium storage device and the reservoir. In addition, there is a pressure medium connection between the pressure medium storage unit and the plunger working space. A controlling of a power brake system takes place using the blocking device in such a way that the return line is blocked relative to the reservoir as soon as a plunger piston, driven by a drive unit, has traveled a definable path in the forward direction.

7 Claims, 1 Drawing Sheet

(56) References Cited

U.S. PATENT DOCUMENTS

| | | | | |
|---|---|---|---|---|
| 2014/0008965 A1* | 1/2014 | Ito | ............ | B60T 8/4081 |
| | | | | 303/3 |
| 2014/0117749 A1* | 5/2014 | Yang | ............ | B60T 7/042 |
| | | | | 303/20 |
| 2015/0224972 A1* | 8/2015 | Feigel | ............ | B60T 8/4081 |
| | | | | 303/15 |
| 2016/0046272 A1* | 2/2016 | Masur | ............ | B60T 13/662 |
| | | | | 303/15 |
| 2016/0082938 A1* | 3/2016 | Vollert | ............ | B60T 11/224 |
| | | | | 303/115.2 |
| 2016/0152219 A1* | 6/2016 | Besier | ............ | B60T 7/042 |
| | | | | 303/15 |

* cited by examiner

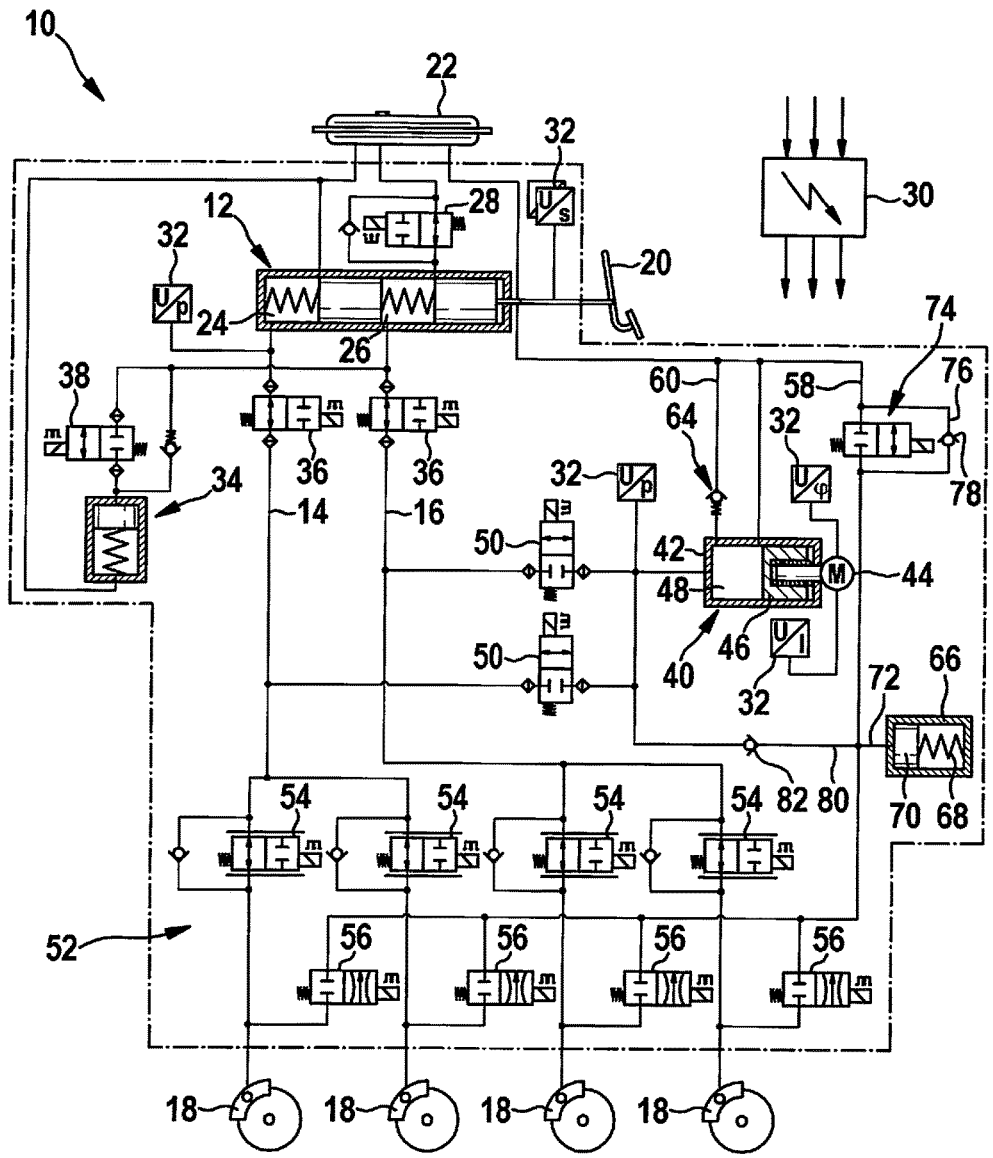

POWER BRAKE SYSTEM HAVING ELECTRONIC SLIP REGULATION, AND METHOD FOR CONTROLLING A POWER BRAKE SYSTEM HAVING ELECTRONIC SLIP REGULATION

CROSS REFERENCE

The present application claims the benefit under 35 U.S.C. § 119 of German Patent Application No. DE 102016212710.1 filed on Jul. 13, 2017, which is expressly incorporated herein by reference in its entirety.

FIELD

The present invention relates to a power brake system having electronic slip regulation, and a method for controlling a power brake system having electronic slip regulation.

BACKGROUND INFORMATION

A power brake system having electronic slip regulation is described, for example, in German Patent Application No. DE 10 2014 205431 A1.

This conventional power brake system has a master brake cylinder that can be actuated by the driver, to which at least one brake circuit having at least one wheel brake is separably connected. Between the master brake cylinder and the wheel brake, there is situated a pressure modulation device having a plunger unit and an electronically controllable pressure adjusting device. The plunger unit has a plunger piston that can be actuated by a drive, which piston is situated in displaceable fashion in a plunger cylinder and which limits a plunger working space in the plunger cylinder whose volume increases or decreases as a function of the direction of the movement of the plunger. The pressure adjusting device adapts the brake pressure provided by the plunger to the slippage conditions that prevail at a wheel of the vehicle associated with a wheel brake. For this purpose, the pressure adjusting device controls, inter alia, a flow of pressure medium from the wheel brake into a return line. This return line is connected to a reservoir of the power brake system for pressure medium. A closed pressure medium circuit results due to the fact that as soon as the plunger piston has reached its outermost point of reversal, or at least has approached this outermost point of reversal, the plunger piston then suctions new pressure medium from the mentioned reservoir by reversing the original direction of motion of the plunger piston. Here, the rest of the brake system is decoupled from the plunger unit through the controlling of corresponding plunger control valves.

Inside the reservoir, atmospheric pressure prevails, and the pressure medium contained there has a separating layer from the ambient atmosphere. For this reason, and in addition because the plunger unit is always reloaded with pressure medium stored upstream in the reservoir, the mentioned pressure medium circuit is referred to as an open pressure medium circuit.

By reversing the direction of movement of the plunger piston when pressure medium is suctioned, theoretically a pressure difference of a maximum of approximately 1 bar relative to atmospheric pressure can be established in the plunger working space. However, the maximum pressure difference is a function of the prevailing ambient conditions, for example the current atmospheric air pressure, weather conditions, and/or elevation above sea level. Accordingly, the pressure difference can turn out to be less, or can be subject to strong fluctuations.

Independent of this, in the suction path of the plunger unit there is provided a check valve in order to block this suction path when the direction of movement of the plunger piston is reversed again after a suction phase, and the plunger unit is operated in a pressure phase or working phase. This check valve is standardly a seat valve in which a valve closing element releases or closes a valve cross-section. The limited valve cross-section of the check valve disadvantageously has a throttling effect on a flow of pressure medium to the plunger unit. In particular at low ambient temperatures, with correspondingly increasing viscosity of the pressure medium, in this way the time is made longer for compensating the pressure medium requirement of the plunger unit, and thus the duration is made longer during which the vehicle brake system can merely hold stable the previously set brake pressure at the wheel brakes, or reduce it. This is because, understandably, during a suction phase of the plunger unit no buildup of brake pressure is possible. The ultimate result is that this lengthens the braking distance of the vehicle.

An object of the present invention is to provide a power brake system such that the duration of a suction phase of the plunger unit is reduced.

SUMMARY

An example embodiment of the present invention may have the advantage that the difference pressure prevailing when the plunger unit is charged with pressure medium is increased, and the volume supplementation capability of the vehicle brake system is less strongly a function of barometric ambient pressure and of the viscosity of the pressure medium than is the case in the existing art. Due to the higher difference pressure, a higher volume flow arises, and the time required to load the plunger unit is shortened. Consequently, the power brake system is more quickly available again for an increase of brake pressure in the brake circuits, and this ultimately brings about a shortening of the vehicle braking distance. In addition, through the present invention the previously open pressure medium circuit becomes a closed pressure medium circuit. A closed pressure medium circuit has the advantage that only pressure medium that has escaped due to pressure medium leakage has to be reloaded. Because pressure medium leakage is inherently limited, the number of recharge cycles required decreases overall. In addition, the risk of an undesired entry of pressure medium contaminated with gas into the pressure medium circuit is reduced. Pressure medium leakage that may occur is limited in its quantity by the present invention, because the pressure medium leakage is buffered, through the present invention, in the pressure medium circuit, and does not flow into the reservoir in the conventional manner. The increased pressure level in the return line due to the pressure medium storage unit according to the present invention counteracts a further pressure medium leakage. For these reasons, the plunger unit can be realized with a smaller plunger working space volume, which in turn has a positive effect on the constructive volume and weight of the pressure adjusting device.

Further advantages or advantageous developments of the present invention are described herein.

BRIEF DESCRIPTION OF THE DRAWING

The present invention is shown in the FIGURE and is explained in more detail below.

The single FIGURE shows an exemplary embodiment of a power brake system having electronic slip regulation according to the present invention, based on a circuit plan in which the individual components of the power brake system are shown on the basis of switching symbols and the pressure medium connections between these individual components are shown as solid lines.

DETAILED DESCRIPTION OF EXAMPLE EMBODIMENTS

The FIGURE shows the design of a power brake system 10 having electronic slip regulation according to the present invention. This system has a master brake cylinder 12 that can be actuated by the driver, to which there are connected two brake circuits 14, 16, each having two wheel brakes 18. Brake circuits 14, 16 are made identical to one another. Actuation of master brake cylinder 12 by a driver can take place for example via a brake pedal 20. A reservoir 22 is connected to master brake cylinder 12. This reservoir supplies pressure medium to two pressure chambers 24, 26 of master brake cylinder 12, each chamber being assigned respectively to one of the brake circuits 14, 16. One of the two supply lines between master brake cylinder 12 and reservoir 22 can be blocked through the electronic controlling of a normally open 2/2-way switching valve. This valve forms a test valve 28 with which for example the proper functioning of power brake system 10 can be tested. Its controlling controls an electronic control device 30 that is shown only schematically in the FIGURE. In order to ascertain control signals, a electronic control device 30 acquires signals from various sensors 32 of power brake system 10, which for example acquire the pressure level in at least one of the brake circuits 14, 16, the pressure level in a plunger working space 48 of a plunger unit 40, an actuation of brake pedal 20, the rotational behavior of the wheels of the vehicle, and/or the power supply and angle of rotation of a drive unit 44 of a plunger unit 40. These signals enable, inter alia, inferences to be made concerning the slip conditions prevailing at the wheels, and permit an adaptation of the brake pressure of wheel brakes 18 to these slip conditions in such a way that a blocking, lasting a longer period of time, of the respectively associated wheels, and thus a failure of the possibility of longitudinally stabilizing the vehicle during a braking process due to a decrease in the brake pressure respectively present, can be avoided.

On the basis of the signal curve of sensor 32 for acquiring the pressure in plunger working space 48 over time, the function of a blocking device 74 that controls a return line 58 from wheel brakes 18 to pressure medium reservoir 22 can also be indirectly monitored.

A pedal path simulator 34 is connected to one of the two pressure chambers 24, 26 of master brake cylinder 12. In case of an actuation of master brake cylinder 12, this pedal path simulator 34 takes pressure medium from this pressure chamber 24, 26 as soon as a pressure medium-conducting connection of this pressure chamber 24, 26 to wheel brakes 18 of associated brake circuit 14, 16 is blocked by a separating valve 36 in this brake circuit 14, 16. In this way, pedal path simulator 34 enables an actuation path of brake pedal 20 without a buildup of brake pressure in brake circuits 14, 16. The stated separating valve 36 is situated downstream from master brake cylinder 12, is realized as a 2/2-way switching valve, and in the base state in which it is not controlled assumes an open position. A separate separating valve 36 is assigned to each brake circuit 14, 16.

In their controlled state, separating valves 36 decouple master brake cylinder 12 from wheel brakes 18, so that the driver can no longer produce brake pressure by actuating master brake cylinder 12. An actuation of brake pedal 20 by the driver then merely indicates a desired braking. The pedal path of brake pedal 20 can be used as actuating variable for this desired braking. A corresponding sensor 32 acquires this pedal path and supplies it to electronic control device 30 of power brake system 10, where the signal is electronically further processed with other signals.

In the case explained here, the brake pressure is produced through electronic controlling of plunger unit 40. For this purpose, plunger unit 40 has a plunger piston 46 that is displaceably accommodated in a plunger cylinder 42 and can be actuated by drive unit 44. This piston 46 can be driven to execute a longitudinal movement in both spatial directions, and limits plunger working space 48, whose volume can be modified, in plunger cylinder 42. Drive unit 44 is preferably an electric motor that can be actuated by control device 30. Sensors 32 are used to acquire the angle of rotation or phase currents of this electric motor. In addition, the angle of rotation signal supplies information regarding the momentary direction of movement of plunger piston 46. When there is a forward movement of plunger piston 46 in plunger cylinder 42, the available plunger working space 48 becomes smaller, and the brake pressure in the connected brake circuits 14, 16 increases. Correspondingly, when plunger piston 46 carries out a backward motion, plunger working space 48 becomes larger, and the brake pressure decreases.

Plunger working space 48 can be blocked relative to the two brake circuits 14, 16 by plunger control valves 50. These plunger control valves 50 are each fashioned as normally closed 2/2-way switching valves, and are situated immediately downstream from plunger unit 40 in each brake circuit 14, 16.

A production of brake pressure by plunger unit 40 always takes place when the described power brake system 10 is in the normal operating state. Master brake cylinder 12 for production of brake pressure actuated by muscular force is active only in case of error of electronic control device 30 of power brake system 10, or its mentioned components. Separating valves 36 of brake circuits 14, 16 then assume their open position, thus creating pressure medium connections between master brake cylinder 12 and wheel brakes 18.

In addition, power brake system 10 has another pressure adjusting device 52 that is provided in order to adapt the brake pressure at wheel brakes 18, provided by master brake cylinder 12 or by plunger unit 40, to the slip conditions currently prevailing there. For this purpose, this pressure adjusting device includes pressure buildup valves 54 and pressure reducing valves 56, each assigned in pairs to each wheel brake 18. A pressure buildup valve 54 controls a flow of pressure medium to wheel brake 18 and thus controls a buildup of brake pressure, while a pressure reducing valve 56 controls a flow of pressure medium from wheel brakes 18 into return line 58, thus controlling a reduction of brake pressure. All pressure reducing valves 56 open into the common return line 58.

Pressure buildup valves 54 are realized as normally open 2/2-way proportional valves, while pressure reducing valves 56 are normally closed 2/2-way switching valves.

Return line 58 conducts pressure medium flowing out from wheel brakes 18 back to reservoir 22. However, before an opening of return line 58 into reservoir 22, a pressure medium line 60 branches off that is connected to plunger working space 48. Through this pressure medium line 60, pressure medium flows to plunger unit 40 as soon as plunger piston 46 changes its direction of motion through controlling of its drive unit 44, and is driven to execute a backwards motion, as a result of which the volume of plunger working space 48 increases, and correspondingly a suction or partial vacuum arises in this plunger working space 48.

A corresponding reversal of the direction of motion of the plunger piston takes place when plunger working space 48 has reached its minimum volume, due to forward-moving plunger piston 46, or has at least approached this minimum volume. When there is a backwards movement of plunger piston 46, plunger control valves 50 are not controlled, and thus block pump [sic] working space 48 relative to brake circuits 14, 16.

A check valve 64 situated in pressure medium line 60 from return line 58 to plunger working space 48 blocks this pressure medium line 60 in the direction toward reservoir 22, and thereby ensures a buildup of brake pressure in brake circuits 14, 16 as soon as plunger piston 46 again moves forward and drives pressure medium into brake circuits 14, 16. Plunger control valves 50 are then opened.

Check valve 64 has (not shown) a valve seat and a valve closing element for controlling a valve cross-section enclosed by the valve seat.

According to the present invention, downstream from pressure reducing valves 56 a pressure medium storage unit 66 is connected to return line 58 via a storage unit inlet 72. Pressure medium flowing out from wheel brakes 18, having a pressure that is higher than an ambient atmospheric pressure, can be stored in pressure medium storage unit 66. As an example, pressure medium storage unit 66 can be realized as a piston storage unit, and can correspondingly have a storage unit piston 70 charged by an elastic storage piston resetting element 68. Storage piston resetting element 68 is situated at a side of storage unit piston 70 facing away from a storage unit inlet 72, whereby a charging of pressure medium storage unit 66 with pressure medium takes place against a resetting force of this elastic storage unit piston resetting element 68. Alternatively, a bellows storage unit would also be possible, in which inflowing pressure medium would be accommodated inside a hollow space enclosed by the bellows, or would charge a hollow space enclosed by the bellows.

In addition, according to the present invention blocking device 74 is situated between pressure medium storage unit 66 and reservoir 22. This blocking device is fashioned by an electronically controllable, normally closed 2/2-way switching valve. In addition, a bypass 76 for the explained blocking device 74 is present, through which pressure medium can flow past blocking device 74. However, in bypass 76 there is situated a bypass check valve 78 that blocks the flow around the blocking device in the direction toward reservoir 22, and permits the flow only in the opposite direction.

In addition, a pressure medium connection 80 is provided between pressure medium storage unit 66 and plunger working space 48. In this pressure medium connection 80 there is situated a storage unit check valve 82 that blocks a flow of pressure medium from plunger working space 48 to pressure medium storage unit 66, and thus prevents plunger piston 46, building up brake pressure through excursion, from being able to convey pressure medium into pressure medium storage unit 66.

Blocking device 74, pressure medium storage unit 66, and pressure medium connection 80 between pressure medium storage unit 66 and plunger working space 48 work together as follows:

In the initial state of power brake system 10, plunger working space 48 assumes its maximum volume and is completely filled with pressure medium. Plunger piston 46 is thus in its inner, or rear, end position. Separating valves 36 are controlled and block master brake cylinder 12 against wheel brakes 18. A simulator control valve 38 is open, as are plunger control valves 50 and pressure buildup valves 54 of wheel brakes 18; pressure reducing valves 56 are in the closed state.

If the driver now indicates a desired braking by actuating brake pedal 20, pressure medium is driven from master brake cylinder 12 into pedal path simulator 34, and brake pedal 20 executes a pedal path. This path is acquired by electronic control device 30 using the provided sensor 32, and is further processed to form a control signal that is supplied to drive unit 44 of plunger piston 46. Plunger piston 46 thereupon executes a forward motion, as a result of which the volume of plunger working space 48 continuously becomes smaller. Correspondingly, the brake pressure increases in connected brake circuits 14, 16 and, via the opened pressure buildup valves 54, in wheel brakes 18 connected thereto.

If now there is a danger of blocking of one of the wheels of the vehicle, pressure buildup valves 54 are closed through electronic controlling and brake pressure reducing valves 56 are opened in order to reduce the prevailing brake pressure in a controlled fashion. Pressure medium flows from the involved wheel brakes 18 into return line 58, and flows back to reservoir 22 through the at first open blocking device 74 of pressure medium storage unit 66.

As soon as plunger piston 46 of plunger unit 40 has traveled a definable path in the forward direction, i.e. in the direction of making plunger working space 48 smaller, blocking device 74 assigned to pressure medium storage unit 66 is closed, so that pressure medium flowing out from wheel brakes 18 now provides a charging of pressure medium storage unit 66.

If plunger piston 46 has again moved forwards, so that the volume of plunger working space 48 is close to its minimum value, plunger control valves 50 are closed and the drive direction of plunger piston 46 is reversed through corresponding controlling of drive device 44. Plunger piston 46 now executes a backwards motion, as a result of which the volume of plunger working space 48 again increases. This causes a decrease in pressure in plunger working space 48, which, together with the pressure in pressure medium storage unit 66, which is higher than the atmospheric pressure in reservoir 22, produces a difference pressure at storage unit check valve 82. This pressure opens storage unit check valve 82, and the pressure medium connection 80 from pressure medium storage unit 66 to plunger working space 48 is released. The flow of pressure medium that results refills plunger working space 48 relatively quickly with pressure medium, and the time period during which plunger unit 40 is not available for an increase in brake pressure in wheel brakes 18 is extremely short.

During the charging of plunger working space 48 with pressure medium, pressure medium flowing out from wheel brakes 18 due to a decrease in brake pressure that continues to take place can be let into pressure medium storage unit 66, or it can flow directly into plunger working space 48 via pressure medium connection 80.

If, at the end of the slip-regulated braking process, pressure medium is still situated in pressure medium storage unit 66, blocking device 74 is opened for a predefined emptying time span, and the pressure medium is pushed out, by the relaxing storage chamber reset element 68, from pressure medium storage unit 66 into pressure medium reservoir 22.

If the volume requirement of plunger working space 48 exceeds the pressure medium volume previously stored in pressure medium storage unit 66, then additional pressure medium can flow from pressure medium reservoir 22 into plunger working space 48. This can take place in a conventional manner via pressure medium line 60 from return line 58 to plunger working space 48, or can take place via bypass check valve 78, connected parallel to blocking device 74, and via pressure medium connection 80 of pressure medium storage unit 66 with plunger working space 48.

Of course, modifications or supplements of the explained exemplary embodiment are possible without departing from the basic idea of the present invention.

What is claimed is:

1. A power brake system having electronic slip regulation for a motor vehicle, comprising:
    a master brake cylinder that can be actuated by a driver;
    at least one brake circuit that is connected separately to the master brake cylinder and that has at least one wheel brake;
    a pressure modulation device situated between the master brake cylinder and the wheel brake, the pressure modulation device having a plunger unit having a drivable plunger piston that is situated in displaceable fashion in a plunger cylinder and that limits a plunger working space whose volume can be modified;
    a pressure adjusting device that is allocated to the wheel brake and that can be controlled electronically, for adapting the brake pressure of the wheel brake to the slip conditions of an associated wheel of the vehicle, the pressure adjusting device controlling a flow of pressure medium from the wheel brake into a return line that is connected to a reservoir for pressure medium; and
    a pressure medium storage unit for storing pressure medium with a pressure that is greater than an ambient atmospheric pressure, the return line being connected to the pressure medium storage unit;
    an electronically controllable blocking device provided between the pressure medium storage unit and the reservoir; and
    a pressure medium connection is fashioned between the pressure medium storage unit and the plunger working space.

2. The power brake system having electronic slip regulation as recited in claim 1, wherein the blocking device is a valve that, through controlling by an electronic control device, can be switched over from a base position to a switched position.

3. The power brake system having electronic slip regulation as recited in claim 2, wherein in its base position, the blocking device assumes the blocking position, and in the switched position, pressure medium can flow through the blocking device.

4. The power brake system having electronic slip regulation as recited in claim 1, wherein a bypass to the blocking device is provided via which pressure medium can flow around the blocking device, a bypass check valve being situated in the bypass that blocks the flow around the blocking device in the direction toward the reservoir.

5. The power brake system having electronic slip regulation as recited in claim 1, wherein in the pressure medium connection of the pressure medium storage unit to the plunger working space there is situated a storage unit check valve that permits flow in the direction from the pressure medium storage unit to the plunger working space and that blocks in the opposite direction.

6. A method for controlling a power brake system having electronic slip regulation, having a master brake cylinder that can be actuated by a driver, at least one brake circuit that is connected separately to the master brake cylinder and that has at least one wheel brake, and a pressure modulation device situated between the master brake cylinder and the wheel brake, the pressure modulation device having a plunger unit that has a drivable plunger piston that is situated in displaceable fashion in a plunger cylinder and that limits a plunger working space whose volume can be modified, and having a pressure adjusting device that is allocated to the wheel brake and that can be controlled electronically, for adapting the brake pressure of the wheel brake to the slip conditions of an associated wheel of the vehicle, and the pressure adjusting device controlling a flow of pressure medium from the wheel brake into a return line that is connected to a reservoir for pressure medium, a pressure medium storage unit being connected to the return line, for storing pressure medium with a pressure that is greater than an ambient atmospheric pressure, an electronically controllable blocking device being provided between the pressure medium storage unit and the reservoir, and a pressure medium connection being fashioned between the pressure medium storage unit and the plunger working space, the method comprising:
    blocking the return line, by the blocking device, relative to the reservoir as soon as the plunger piston, driven by a drive unit, has traveled a definable path in a forward direction.

7. The method for controlling a power brake system having electronic slip regulation as recited in claim 6, wherein the return line blocked by the blocking device is released at least one of: (i) when the plunger working space is completely filled with pressure medium, and (ii) when the pressure medium storage unit is emptied.

* * * * *